(12) United States Patent
Bauer

(10) Patent No.: US 9,009,094 B2
(45) Date of Patent: Apr. 14, 2015

(54) KNOWLEDGE BASED METHOD AND SYSTEM FOR LOCAL COMMERCE

(71) Applicant: Michael Bauer, Denver, CO (US)

(72) Inventor: Michael Bauer, Denver, CO (US)

( * ) Notice: Subject to any disclaimer, the term of this patent is extended or adjusted under 35 U.S.C. 154(b) by 0 days.

(21) Appl. No.: 14/091,080

(22) Filed: Nov. 26, 2013

(65) Prior Publication Data

US 2014/0089244 A1 Mar. 27, 2014

Related U.S. Application Data

(63) Continuation of application No. 12/904,656, filed on Oct. 14, 2010, now Pat. No. 8,626,692.

(51) Int. Cl.
*G06Q 30/02* (2012.01)
*G06N 5/02* (2006.01)
*G06F 17/30* (2006.01)
*H04L 12/24* (2006.01)

(52) U.S. Cl.
CPC .............. *G06N 5/02* (2013.01); *G06Q 30/0201* (2013.01); *G06F 17/30864* (2013.01); *G06N 5/025* (2013.01); *G06Q 30/02* (2013.01); *H04L 41/0213* (2013.01)

(58) Field of Classification Search
USPC .............. 706/47; 709/223; 707/705; 705/1.1
See application file for complete search history.

(56) References Cited

U.S. PATENT DOCUMENTS

2010/0049766 A1\* 2/2010 Sweeney et al. .............. 707/737

\* cited by examiner

*Primary Examiner* — Alan Chen
(74) *Attorney, Agent, or Firm* — Locke Lord LLP

(57) ABSTRACT

A system and method that utilizes knowledge representation system to express relationships among consumers, between consumers and businesses, within a specific business, and across businesses. The system and method supports defining which businesses consumers patronize, which locations they prefer, and what products and services they intend to secure from what businesses. The system can supports defining how businesses are structured, what businesses are similar, and how businesses relate both to consumers and to other businesses. By combining this consumer knowledge and business knowledge the system enables a number of mutually compatible applications across a matrix of consumer and business interactions (consumer-to-consumer, consumer-to-business, and business-to-business).

20 Claims, 22 Drawing Sheets

HOME ENTERPRISES PARENTS ESTABLISHMENTS RELATIONS ENTITIES NAICS USERS　　　LOGOUT

WHAT [        ] Search    WHERE [        ] Search

Walgreens

Nearest Location

1235 E Evans Ave (82055)

[Set Preferred Location]

Around 1506 south washington street, denver co 80210

Visited Places

[1506 south washington street, denver co 80210 ▾] Go

[map image]

Things

What to buy here....

Hair Dryer

Add things to buy....

There

Where else to go....

Rite Aid
Duane Reed

People

Who else shops here....

John Smith
Lisa Jones

About

Websites:

http://www.walgreens.com

There

Businesses we know....

1. Walgreens (93686)
245 S. Sheridan Blvd (3304)

2. Walgreens (93686)
245 S. Sheridan Blvd (3743)

3. Walgreens (93686)
12700 W 32nd Ave (4840)

4. Walgreens (93686)
12700 W 32nd Ave (4344)

5. Walgreens (93686)
6300 W Colfax Ave (5326)

6. Walgreens (93686)
10140 W Colfax Ave (5229)

7. Walgreens (93686)
720 E 120th Ave (962A)

8. Walgreens (93686)
720 W 120th Ave (9628)

FIG. 11

HOME ENTERPRISES PARENTS ESTABLISHMENTS RELATIONS ENTITIES NAICS USERS          LOGOUT

WHAT
[        ]  (Search)

WHERE
[        ]  (Search)

Hair Dryer

Around 1508 south washington street, denver co 80210

Visited Places 1508 south washington street, denver co 80210  (Go)

About

See offers for Hair Dryer.

There

Where you buy...
Walgreens

There

Businesses we know....

1. Walgreens (93686)
1235 E Evans Ave (82055)

Add more places to shop...

People

Who else is looking for this...
Lisa Jones

FIG. 12

KNOWLEDGE BASED METHOD AND SYSTEM FOR LOCAL COMMERCE

This application is a continuation of U.S. patent application Ser. No. 12/904,656 filed Oct. 14, 2010, the entire disclosures of which are hereby incorporated by reference herein. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for facilitating real-world local commerce by helping people automatically and simultaneously find, discover, explore and chronicle the multiple physical businesses, services, and products tailored to meet their shopping, travel, and moving needs regardless of native language using a knowledge-based multilingual keyword management system that complements existing text-based search systems to provide increased relevancy, improved ranking, enhanced advertising and ultimately, completely new classes of applications.

BACKGROUND OF THE INVENTION

Typical web-based information services help consumers manually search for specific businesses or categories of businesses in particular locales multiple times using text-based indexing and retrieval techniques in combination with geographic information systems. In response to goal-oriented searches (shopping in Denver, travel to London, and moving to Mexico) typical web-based information services will return a set of results about achieving those goals that include stories, sites and forums but not a composite set of results (lists of clothing stores, restaurants, and beauty salons for "shopping in Denver") tailored to meeting specific goals for particular consumers. While text-based indexing and retrieval techniques provide facilities for finding business based on business names or business categories, they base their results primarily on web site content, however, they generally do not make use of knowledge about achieving local commerce goals, the industries relevant to different businesses that satisfy those goals, the structure of businesses, the relationships among businesses, the physical surroundings of businesses, the interactions between businesses and consumers, and the interaction among consumers for achieving those goals. Knowledge-based technologies can provide a framework for defining, developing and storing such knowledge, but such technologies have not been used to develop consumer/business interaction knowledge databases and have not been integrated into consumer oriented web-based information services.

SUMMARY OF THE INVENTION

In one embodiment the invention comprises a system that provides a knowledge-based approach to multilingual keyword management that supports the expression of different types of relationships among keywords, different weightings of those relationships, and altogether different contexts for sets of different keywords and their relationships among one another. A knowledge base derived from such a system can be used to refine search results, affect the ranking of search results, and enable the creation of new classes of search-based applications. In one embodiment, the invention comprises a system and method that utilizes knowledge representation system to express relationships among consumers in general and among specific consumers, between consumers and businesses and their locations, within a specific business and its locations, between businesses, their locations, and their physical surroundings, and across businesses and their locations. This knowledge is provided by individuals, collected from groups, and derived from statistical analyses. The knowledge base derived from such a system can be used to provide new ways of visualizing maps of local commerce and supporting social interactions among consumers of local commerce. In one embodiment, the system and method supports defining which businesses consumers patronize, which locations they prefer, what products and services they intend to secure from what businesses, their current location, the time of day, and interactions among groups of consumers concerning different businesses, alternatives, and locations. By combining this consumer knowledge and business knowledge the system and other embodiments enables a number of mutually compatible applications across a matrix of consumer and business interactions (consumer-to-consumer, consumer-to-business, and business-to-business) to help satisfy local commerce needs and goals.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

FIG. 7 illustrates one embodiment of how keywords can be connected to one another through typed and weighted relationships within and across multiple contexts that represent different languages.

FIG. 8 illustrates one embodiment of an administrative user interface for managing keywords using typed and weighted relationships within and across multiple contexts.

FIG. 9 illustrates one embodiment of an administrative user interface for connecting and editing keywords en masse through typed and weighted relationships in an inheritance hierarchy.

FIG. 10 illustrates one embodiment of a consumer application for a user showing the closest locations of a set of businesses, a set of products and as set of people the user has defined relationships with.

FIG. 11 illustrates one embodiment of a consumer application for a user showing all of the locations of a specific business, similar businesses to that specific business, a set of products for that business that a user has established relationships with along with a set of people that also have a relationship to that specific business.

FIG. 12 illustrates one embodiment of a consumer application for a user showing a specific product that a user has established a relationship with, the nearest location of a business for that product, and a set of people that have also defined a relationship with that product.

DETAILED DESCRIPTION

Figure 1:
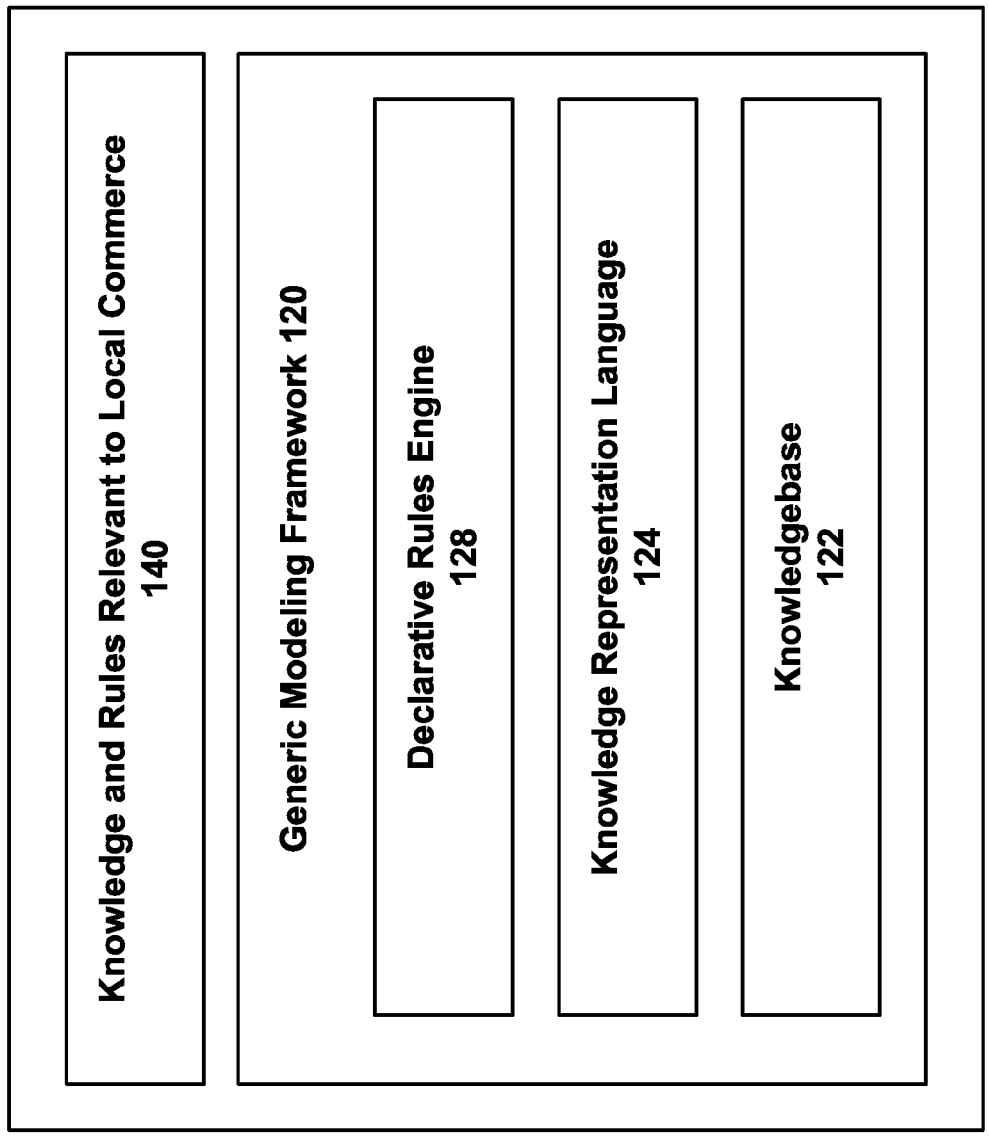
FIG. 1 illustrates one embodiment of an overall architecture of a knowledge-based system for local commerce.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which can provide processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

Web-based information services can provide consumers a broad array of information relating to goods and services offered by businesses in widely distributed geographical locations. Such web-based information services commonly rely on text-based indexes built using keywords and phrases extracted from webpages, databases or other documents accessible on user and business websites. Such indexes are typically searched using relatively simple query models such as, for example, a "bag of words" query model (e.g. a Naive Bayes classifier) in which web documents containing one or more query tokens are identified and ranked based on the closeness of fit between the query tokens and the document. Using such systems, consumers manually can search for multiple locations of a single business using text-based indexing and retrieval techniques and in turn have to manually search again to find multiple locations for another business and so on, and so on.

There is a great deal of information, however, that is not represented in such text based indexing schemes. Consumers and businesses are multifaceted entities that have structure, multiple attributes and preferences, exhibit complex patterns of behavior and have a network of relationships with other entities. Text-based indexing and retrieval techniques solve problems for finding business based on business names or web site content but ignore the use of knowledge about business and consumer interaction to move from search results to decision support and finally through to discovery services.

In one embodiment, the present system and method complements existing text-based search through a knowledge-based approach to multilingual keyword management that supports the expression of different types of relationships among keywords, different weightings of those relationships, and altogether different contexts for sets of different keywords and their relationships among one another. A knowledge base derived from such a system can be used to refine search results, affect the ranking of search results, improve advertising targeting and enable the creation of new classes of applications.

In one embodiment, the present system and method can facilitate real-world local commerce by helping people automatically and simultaneously find the multiple physical businesses, services, and products they need by using a combination of architecture, technology and content drawn from knowledge-based, web site, and/or mobile information systems. By targeting specific problems in locating businesses, services and products, the present system and method can provides a platform for enabling new categories of local commerce applications across foreign languages. For example, the system can be configured to help consumers automatically discover the single nearest location for multiple businesses using knowledge-based profiling and reasoning techniques instead of requiring the consumer to issue multiple searches for different businesses (e.g. one for Walgreens, another for Safeway, another for Wells Fargo).

In another embodiment, the present system and method can facilitate real-world local commerce through the monitoring, filtering, and requests for offers from businesses through third-parties across a variety of industries and in a variety of languages. By providing a structured local commerce language that's native-speaker independent, the present system and method can facilitate the monitoring, filtering and requests for commercial offers in multiple languages that can be used by consumers and businesses alike. Consumers can request offers for "bicycle rental" in English and have the system automatically search for "fietsverhuur" in Dutch given the user's current location. On the other hand, a company that provides SEO (Search Engine Optimization) services can monitor requests for "bicycle rental" across a number of sites in a number of countries simultaneously. This single use example (bicycle rental) can be expanded to providing compound search results to goal-oriented queries (cycling in Netherlands).

FIG. 1 illustrates one embodiment 100 of the overall architecture of a knowledge-based system for local commerce. The system is based on a generic modeling framework. 120. The framework includes a knowledge representation language 124. The knowledge representation language 140 supports the expression of concepts that exist in a multiple typed relationships to one another in multiple contexts (different languages for example). The knowledge representation language can be used to define a knowledge base 122, which can be structured as a weighted bidirectional typed graph, where both nodes and relationships can be treated as first class typed objects and asserted in multiple contexts. Nodes (memes) can represent any type of real-world or conceptual object, such as, for example, a consumer, a business, or categories of consumers or businesses, a consumer product or services, an activity, or a category of consumer products or services. The provenance of all memes (source author, timestamp) is recorded. Relationships can express any kind of connection or relationship between nodes within the network. There are four classes of relationships initially specified. Taxonomic relationships provide inheritance semantics (if a business is a repair business then accreditation is important); Compositional relationships provide aggregation semantics (a bicycle is composed of frame and components). Functional relationships provide transformational semantics (if a company sells a product then payment methods, delivery methods, and service options are required). Temporal relationships provide sequencing semantics (credit checks are required before purchase approval). These relationships can be used to augment URIs (Uniform Resource Identifiers) with additional, contextual information for disambiguation purposes. Contexts are used to group memes and relationships together so they can be defined for a particular domain of discourse (such as for a particular language, like Dutch). The ability still exists for the same basic meme (bicycles in the English context) to be treated the same across different contexts (fietsen in the Dutch context).

In one embodiment, the knowledge base can express the structure of corporations, and how corporations can interact with one another, what businesses are similar, and how businesses relate both to consumers and to other businesses. In one embodiment, the system can support defining which businesses consumers patronize, which locations they prefer, and what products and services they intend to secure from what businesses. In one embodiment, the system can model an activity "Shopping for Women", use basic information that such an activity would include not only shopping but acquiring services at places like a beauty salon, use the analysis that salons are highly correlated to restaurants, suggesting them as well, and use the weighting of markets served (a business sells 100% to women—no men or children) to target businesses accordingly.

The knowledge base supports multiple contexts, versions, sources, and languages. In one embodiment, the knowledge base can support the acquisition of information about businesses and consumers from multiple sources over a period of time and in multiple languages. Knowledge management is facilitated through contexts and enable tracking of changes in the ontology and cross-references to original knowledge sources (such as unique identifiers used by international standards bodies). Different ontologies can be constructed in different languages and cross-referenced to one another through language-independent concept representations (bicycles (English), fietsen (Dutch), and cykler (Danish) are all the same concept, share the same globally unique identifier, but are presented in different contexts using different labels). Businesses are characterized by what products and services they provide, not what "heading" or "category" in which they are listed, providing a more accurate and relevant method for "categorizing" businesses. Such an approach allows for the easier modeling of large businesses (like department stores) and of unusual businesses (like the store that has a coffee bar, sells books, and sponsors volunteer programs). This approach also takes into account the relative volume of content available per business and collapses or expands the scope of relevant knowledge used for that business accordingly (for example, a chocolatier may only sell chocolate whereas a bakery would sell baked goods and by implication cakes, cookies, and breads). A company that sells only one thing might actually come up highest in the results vs a company that sells many things. Geographic ontologies are used to further support local search and discovery so that different searches for different things use different logical search areas (for example, search for dry cleaning would be restricted to the logical neighborhood level while a search for new cars would be expanded to the logical city level).

Layered over the knowledge representation components is a declarative rules engine 128. In one embodiment, the rules engine enables additional logic over that available from the knowledge framework. The rules engine supports the expression of logical inferences and transformations for concepts based in part on the typed relationships. Support for different programming and human languages for the framework can be built in.

One major use of the rules engine is in the import of large databases of business and geographic point-of-interest information into the knowledge base 120. In one embodiment, the rules engine can also used to pattern match against user interests to make recommendations of other businesses in various applications. In one embodiment the rules engine can also be used to "de-duplicate" listings when conflating listings from multiple data sets using the knowledgebase as a guide. Different rules can be applied when trying to match two listings for a doctor's office (since doctors tend to share the same address in a medical building) versus trying to match two listings for a coffee shop (since it is possible for two Starbucks to be across the street from one another).

Layered on top of the generic modeling framework are specific knowledge and rules 140 relevant to local commerce. A distinction can be made between an establishment (a physical location of a business like the Home Depot at e.g. 1755 Santa Fe Drive, Denver Colo. 80210) and an enterprise (the Home Depot corporation). Different types of establishments for an enterprise can further distinguished, if relevant (Home Depot Regional Management Offices versus Home Depot store locations). Complex establishments themselves can even be modeled such as a Supermarket that contains a bank branch and a Starbucks.

Figure 2:
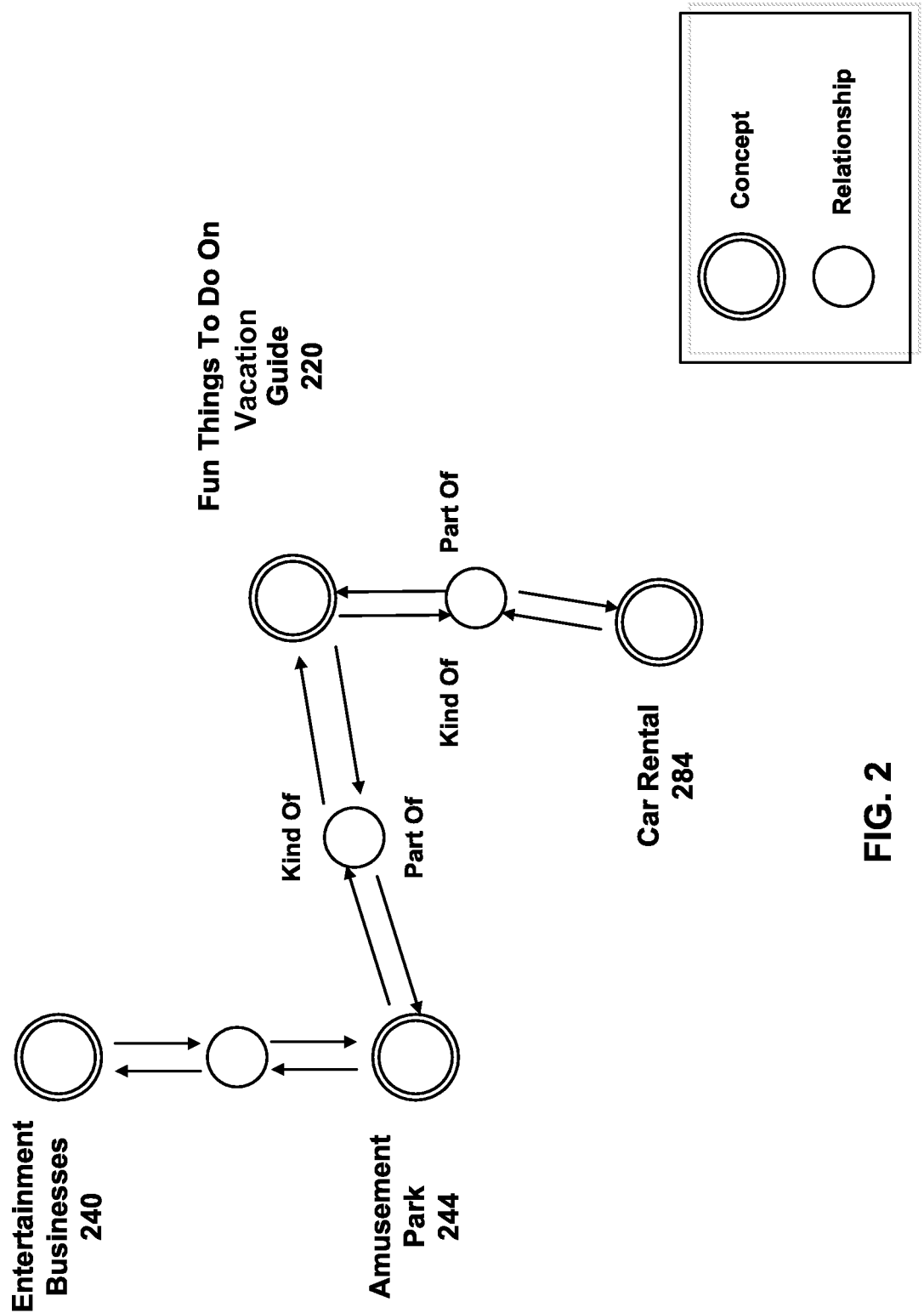
FIG. 2 shows a simple example of how a generic modeling framework can be used to model modeling of simple inheritance of information among concepts related to one another via taxonomic relationships.

FIG. 2 shows a simple example of how a generic modeling framework can be used to model simple inheritance of information among concepts related to one another via taxonomic relationships. The example shows a portion of a knowledge base relating, at least in part to a concept, a Guide type concept 220, labeled "Fun Things To Do On Vacation", which represents activities and resources persons visiting an area might use. The guide concept 220 has a number of related concepts. An amusement park 244 is part of the guide object, and is a kind of "Fun Thing To Do On Vacation". The amusement park concept 244 can also be related to other concepts. In the example, amusement park concept 244 is a kind of entertainment business 240. The guide 220 could also relate to ancillary services that could be of use to a traveler, such as a car rental 284, which in turn is a kind of rental business 285. Different things can be deduced about the different concepts based on these relationships. For example, car rental businesses, being rental businesses, will require things like rental contracts to conduct local commerce. The use of "activity-driven" modeling is embodied in the concept 220. Vacationing, Cycling, and Shopping are all examples of activities that are modeled in the present method and system.

Figure 3:
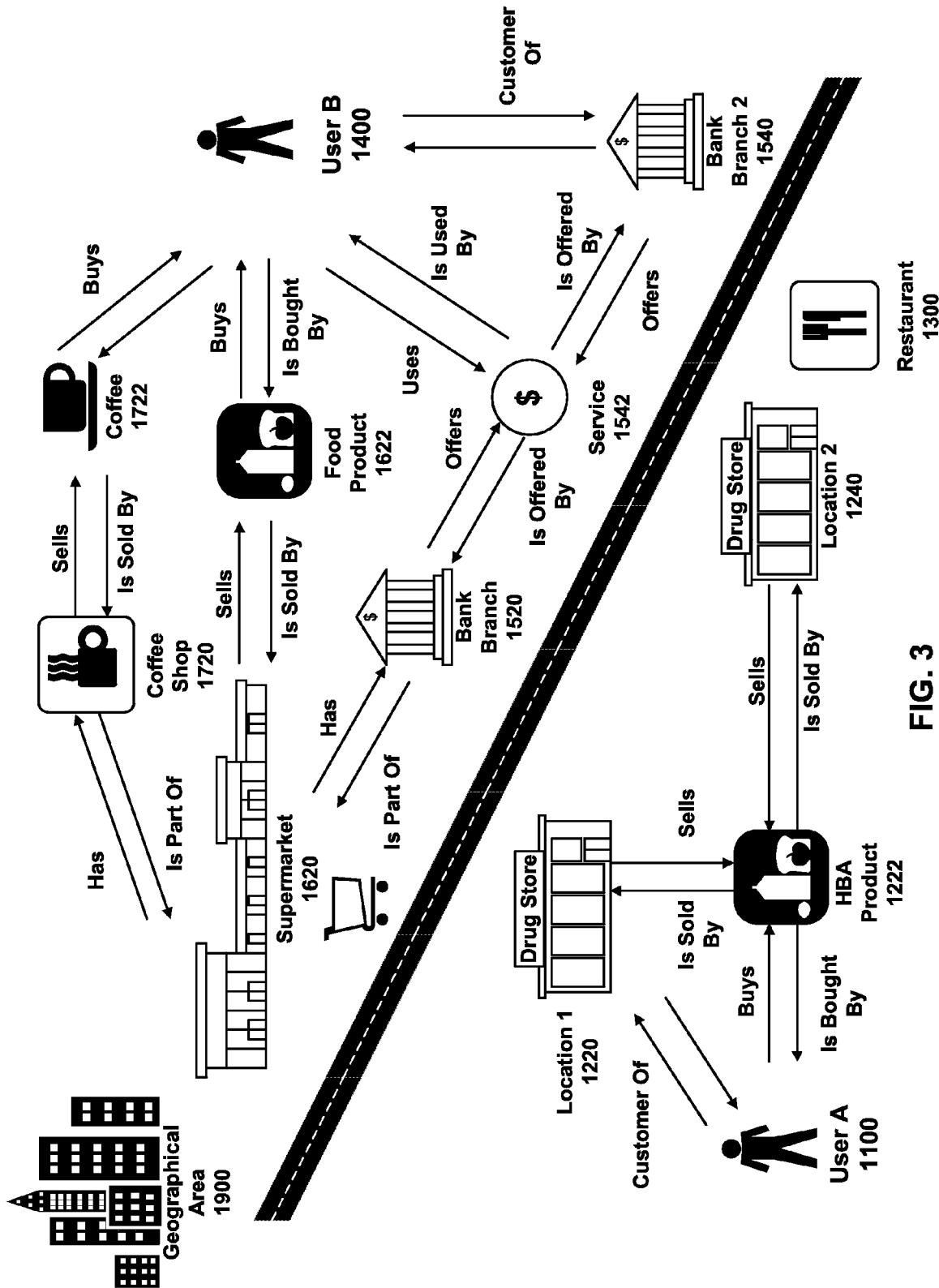
FIG. 3 illustrates one embodiment of the additional types of concepts and relationships that could be modeled within of a knowledge-based system for local commerce.

FIG. 3 illustrates one embodiment of the additional types of concepts and relationships that could be modeled within of a knowledge-based system for local commerce. For the purposes of the example, assume all the entities shown are located in are in a specific geographical area 1900.

User A 1100 is a customer of drug store location 1 1220, and purchases a specific product 1222 at the drug store. The same drug store chain has a second location in the area, location 2 1240. Both drug store locations sell the product 1222. There is a restaurant 1300 near drug store location 2, 1240. User B 1400 is a customer of branch bank 2, 1540, and uses a service 1542 (e.g. checking, ATM ect.) of the bank. User B commonly buys a food product 1622 and a coffee product 1722. A supermarket 1620 sells the food product 1622, contains a coffee shop 1720 that sells the coffee product 1722, and a branch bank 1520 that offers the banking service 1542.

In one embodiment, User A 1100 and User B 1400 can interact with one another through connections between each user, the stores they patronize, and the products they purchase. User B 1400 might visit Drug Store Location 2 1240 and interact with User A 1100 to determine their opinion on the Drug Store corporation or the specific Drug Store location. Conversely, User A 1100 might intend to buy Food Product 1622 (at Supermarket 1620) and interact with User B 1400 to gauge their evaluation of the product. The interaction would be based on privacy options and guided by interaction practices.

Figure 4:
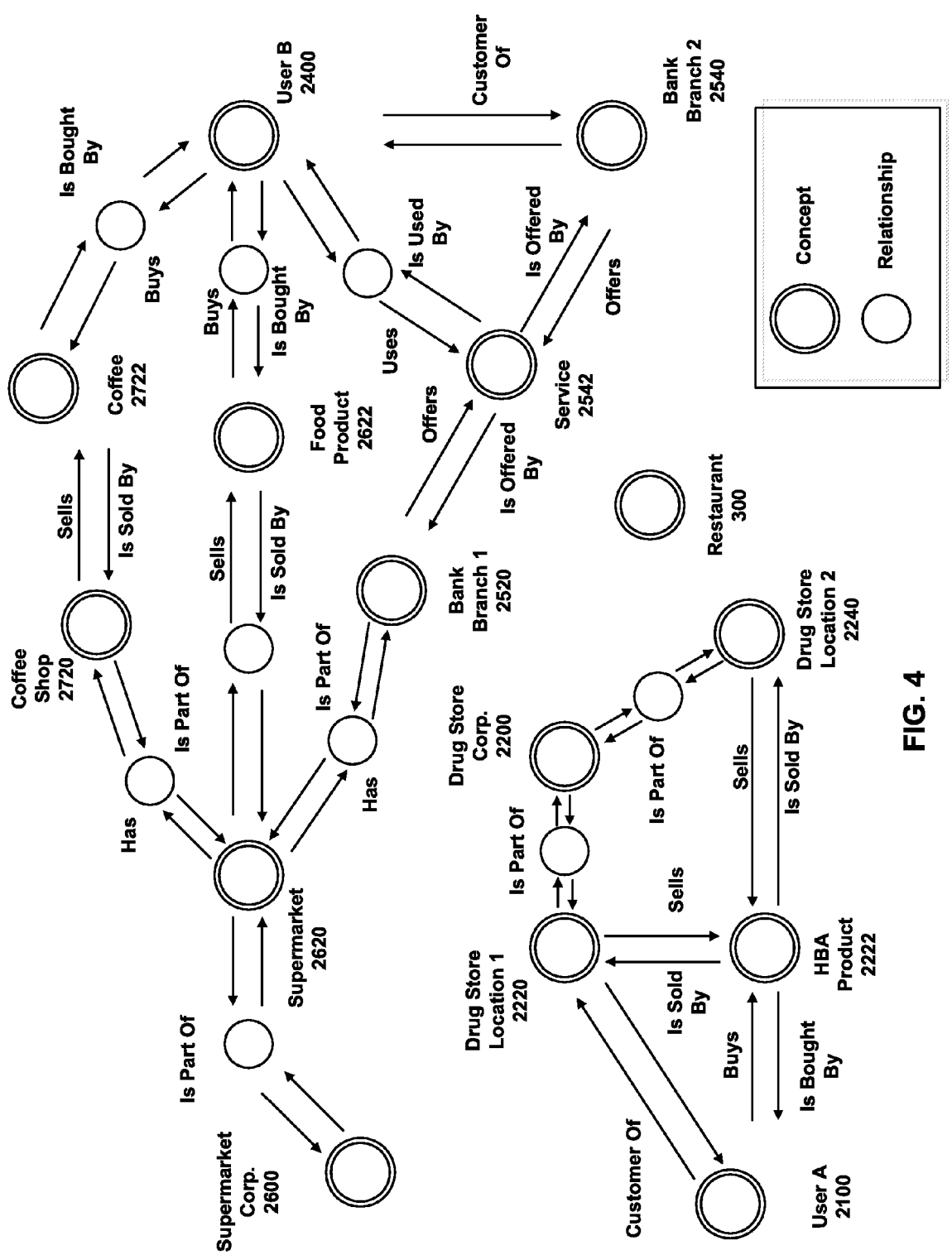
FIG. 4 illustrates how the concepts and relationships illustrated in FIG. 4 in a knowledgebase within an embodiment of a knowledge-based system for local commerce.

FIG. 4 illustrates how the concepts and relationships illustrated in FIG. 4 in a knowledgebase within an embodiment of a knowledge-based system for local commerce. Each of the entities and relationships in FIG. 3 is represented by a corresponding concept and relationship objects. The example shows additional information about businesses within the knowledgebase. The drug stores 2220 and 2240 are part of a drug store corporation 2200 and the supermarket is part of a supermarket corporation 2600. The knowledgebase could provide additional information such as taxonomic relationships between the concepts shown and topical concepts such as, for example, categories of businesses such as retailers or financial services (such concepts and relationships not shown for the sake of clarity.)

Thus, relationships between consumers and businesses can be modeled and be used for various applications. For example, the knowledgebase can be used to help User A 1100 buy a product at any drugstore location, such as locations 1220 and 1240 of FIG. 3 they may be nearby. If, for example, suppose User A 1100 was going to meet a friend, User B at a restaurant 1300 for breakfast. The system can automatically search for all nearby establishments the consumer patronizes and be informed that a product, e.g. shaving cream, can be found at drug store location 1240 that happens to be near the restaurant 1300.

In one embodiment, the system use statistical techniques to identify related businesses to one another for the purposes of identifying potentially interesting groups or clusters of businesses. For example, a high correlation has been established between hair salons and restaurants. This correlation suggests that a particular area might have a high interest for dining and shopping. Using this information can facilitate discovery of local business areas for consumers, such as those traveling to unfamiliar areas. Such statistical correlations could be analyzed dynamically, or could be analyzed prospectively and used to create or update concept or relationship nodes and can be represented in multiple forms including maps.

In one embodiment, the system could additionally use a consumer profiles to project interests in finding businesses relevant to different contexts. For example, when traveling or moving, the system uses consumers' profiles for specific businesses to project their interests. Profiles that define interests in Walgreens (a Pharmacy) and King Soopers (a Supermarket) can be used to find their equivalents in other areas (Duane Reed and Safeway). Profiles that include "lifestyle" and demographics can also be used to project interests (high-income areas with golf courses).

Figure 5:
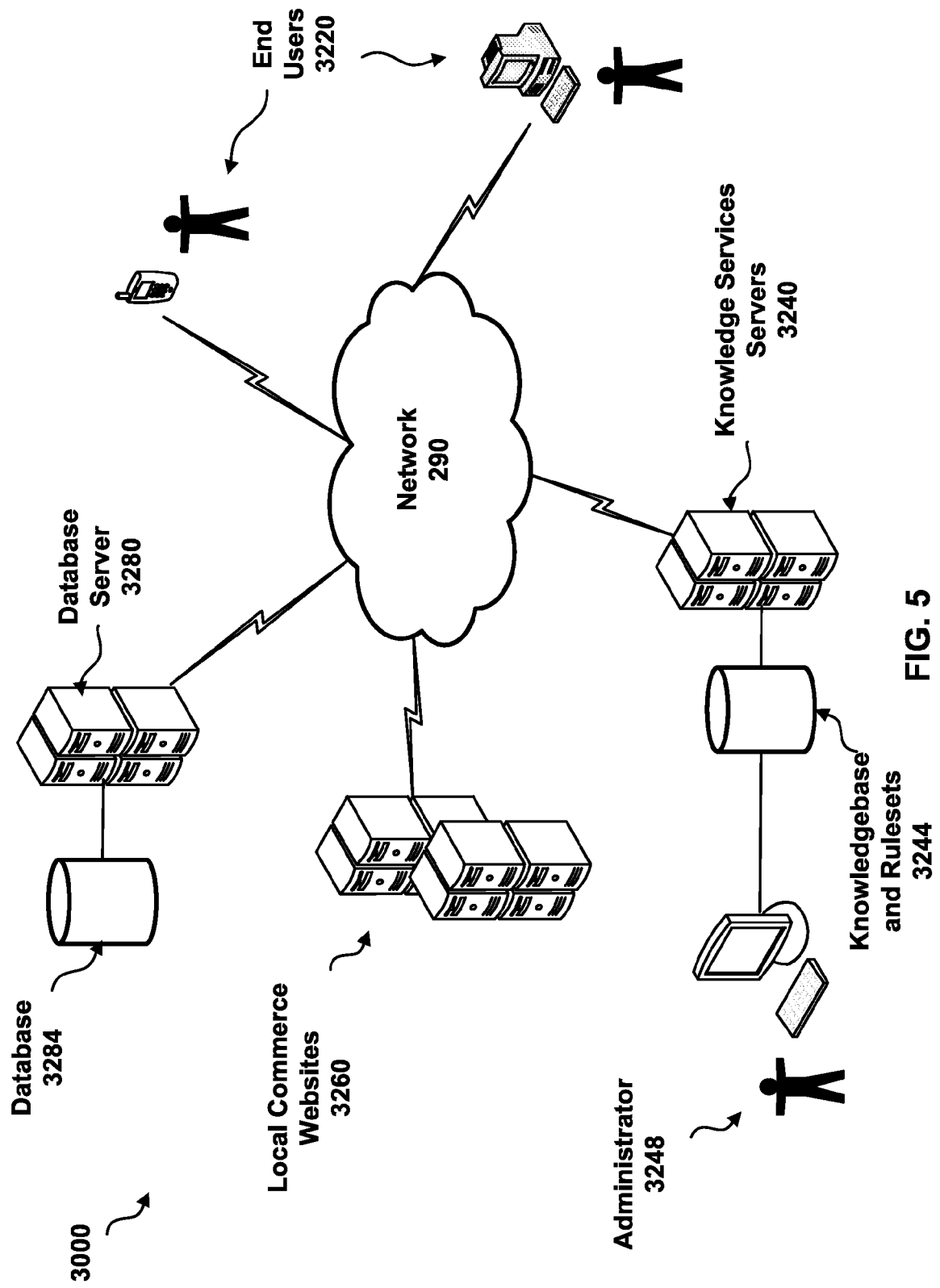
FIG. 5 illustrates one embodiment of an overall environment in which the system illustrated in FIG. 1 could exist.

FIG. 5 illustrates one embodiment of an overall environment in which the system illustrated in FIG. 1 could exist. The system could be implemented on one or more knowledge services servers 3240. Such servers 3240 could be owned by a service provider, or leased or represent virtual services implemented on a cloud based server environment. One or more knowledgebases and/or rule sets could be stored on computer readable media 3244 accessible to the server 3240. A knowledge-based system implemented on the server gathers data relevant to local commerce from various sources, such as, for example, local commerce websites 3260 and database servers 3280 hosting databases 3284 containing data of interest, which could include local commerce directories, consumer profiles, consumer spending patterns or any other type of data that could be useful in building a knowledgebase. The present method and system can also support the manual collection of data that requires more "human judgment", such as what kind of "ambiance" a place has, whether it is "kid friendly", or whether it might be relevant for "fun things to do on vacation." This manual collection of content is supplemented by the knowledge-directed automatic collection of content from crawling, scraping, and trolling third-party sites.

A knowledge based system implemented on the server could provide one or more user interfaces and/or applications to allow users 3220 (which could be consumers, analysts, or businesses, to access information stored in the knowledge bases 244 in various ways. Such a system could enable a number of mutually compatible applications across a matrix of consumer and business interactions (consumer-to-consumer, consumer-to-business, and business-to-business). Such a system enables developers to create applications more through declarative rather than procedural means.

An Illustrative Generic Modeling Framework

Figure 6:
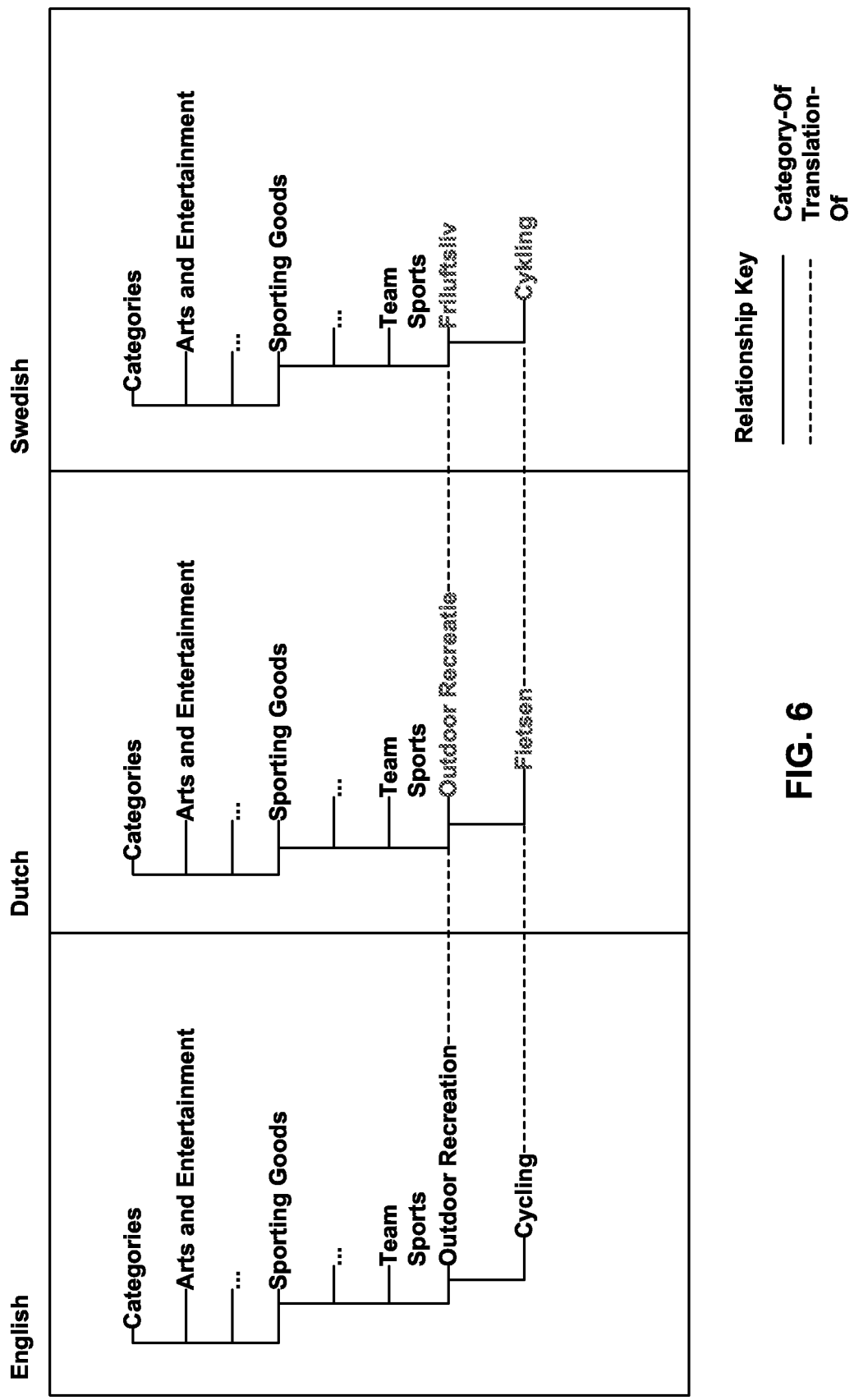
FIG. 6 illustrates one embodiment of the use of the system in the management of business category hierarchies across multiple languages.

FIG. 6 illustrates one embodiment of the use of the system in the management of business category hierarchies across multiple languages. The following examples illustrate how a generic modeling framework could be implemented in a Rails programming environment and how the multilingual business category hierarchy model could be generated. The examples provided below are not exhaustive, and could be implemented in other programming environments supporting similar constructs, as will be readily apparent to those skilled in the art.

Contexts

Contexts are used to differentiate groups of related Memes. To create a context, parameters are provided for human-readable names as well as machine-readable slugs (which do not contain spaces and can be used in creating URIs that reference the contexts.

```
@english = Context.create!(:name =>"English", :slug => "en") @dutch =
Context.create!(:name =>"Dutch", :slug => "nl") @swedish =
Context.create!(:name =>"Swedish", :slug => "se")
```

Calls to find, update, and delete contexts based on the name and/or slug complement the call to create a context.

Relationships

Relationships are built on the semantic idea of subject-verb-predicate, where the subject node somehow relates across a "verb"—relationship type—to a predicate node. In one embodiment, helper relationships make it easier to create the Relationships as well.

```
@category_of = Relationship.create!( :name
    =>"Categories, :slug =>
    "category_of", :type =>
    "taxonomic")
@translation_of = Relationship.create!( :name
    =>"Translations", :slug =>
    "translation_of", :type =>
    "functional")
```

Note that Relationships are treated in a similar manner as "Memes". Calls to find, update, and delete contexts based on the name and/or slug complement the call to create a relationship.

Memes

Memes represent concepts either within a single context or across multiple contexts. To create a meme, the name and slugs are provided and a particular context. If so desired, all contexts can be chosen and a relationship specified to relate the same Mettle across contexts.

```
@outdoor_recreation = Meme.create!(
    :name => "Outdoor Recreation", :slug =>
    "outdoor_recreation", :context => :all,
    :via => @translation_of)
@cycling = Meme.create!(:name => "Cycling",
    :slug => "cycling", :context =>
    : all,
    :via => @translation_of)
```

To link Memes explicitly, a subject-verb-predicate formalism is utilized with the context mechanism.

```
Relationship.link(:subject => @cycling,
    :predicate => @category_of,
    :object => @outdoor_recreation,
        :weight => 100, :context =>
        :all)
```

Methods to find, update, and delete Memes are provided in a similar fashion. The source of memes and the users which modify Memes are recorded. This is an example of finding and updating a meme in a specific context.

```
@cycling = Meme.find(:name => "Cycling", :context => "n1")
@cycling.name = "Fietsen"
@cycling.save!
```

This illustrates how in one embodiment, Memes are used to define the same concept across multiple contexts but can be modified appropriately within specific contexts.

An Illustrative Administrative User Interface

Figure 7:
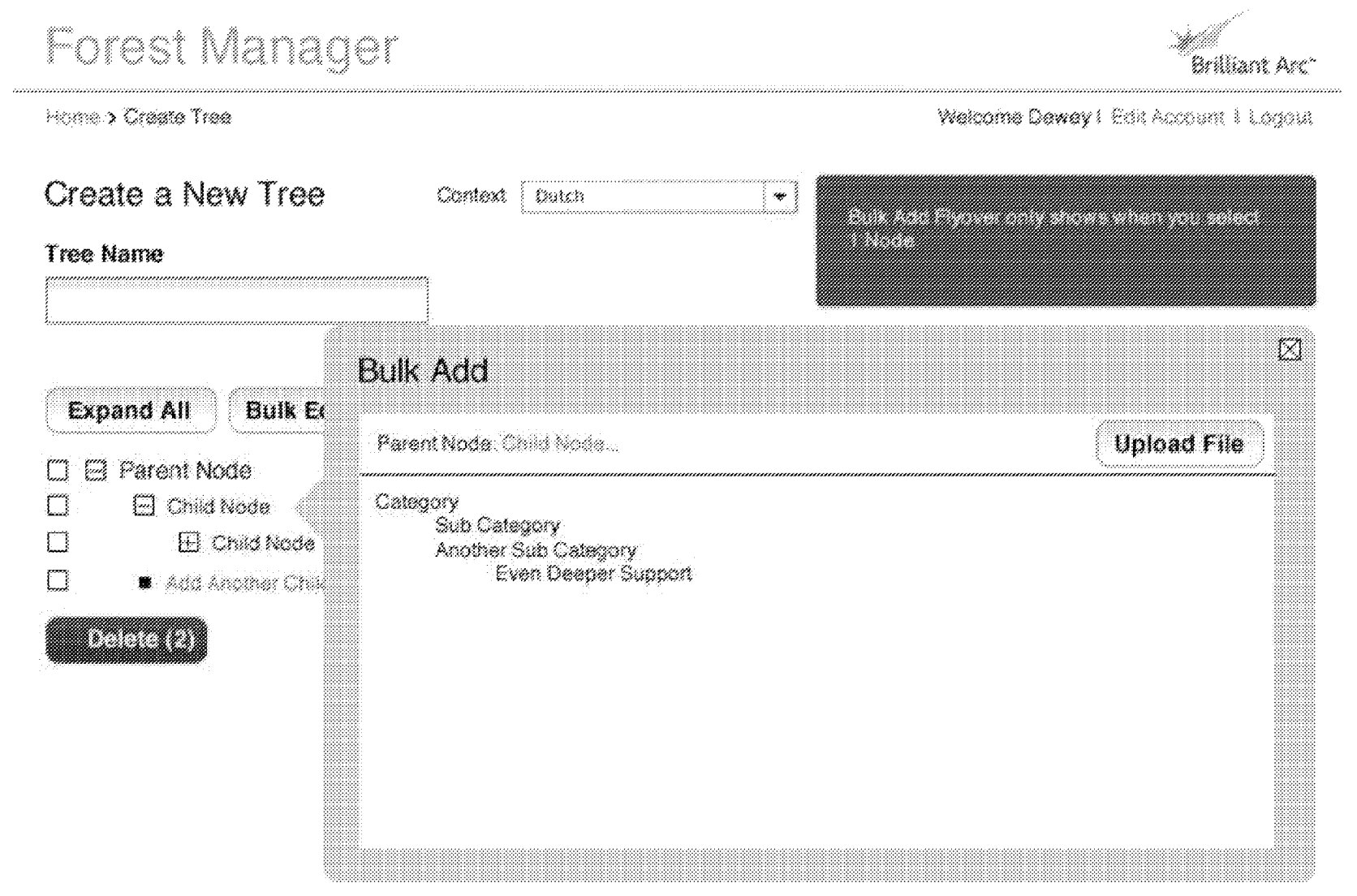
Figure 8:
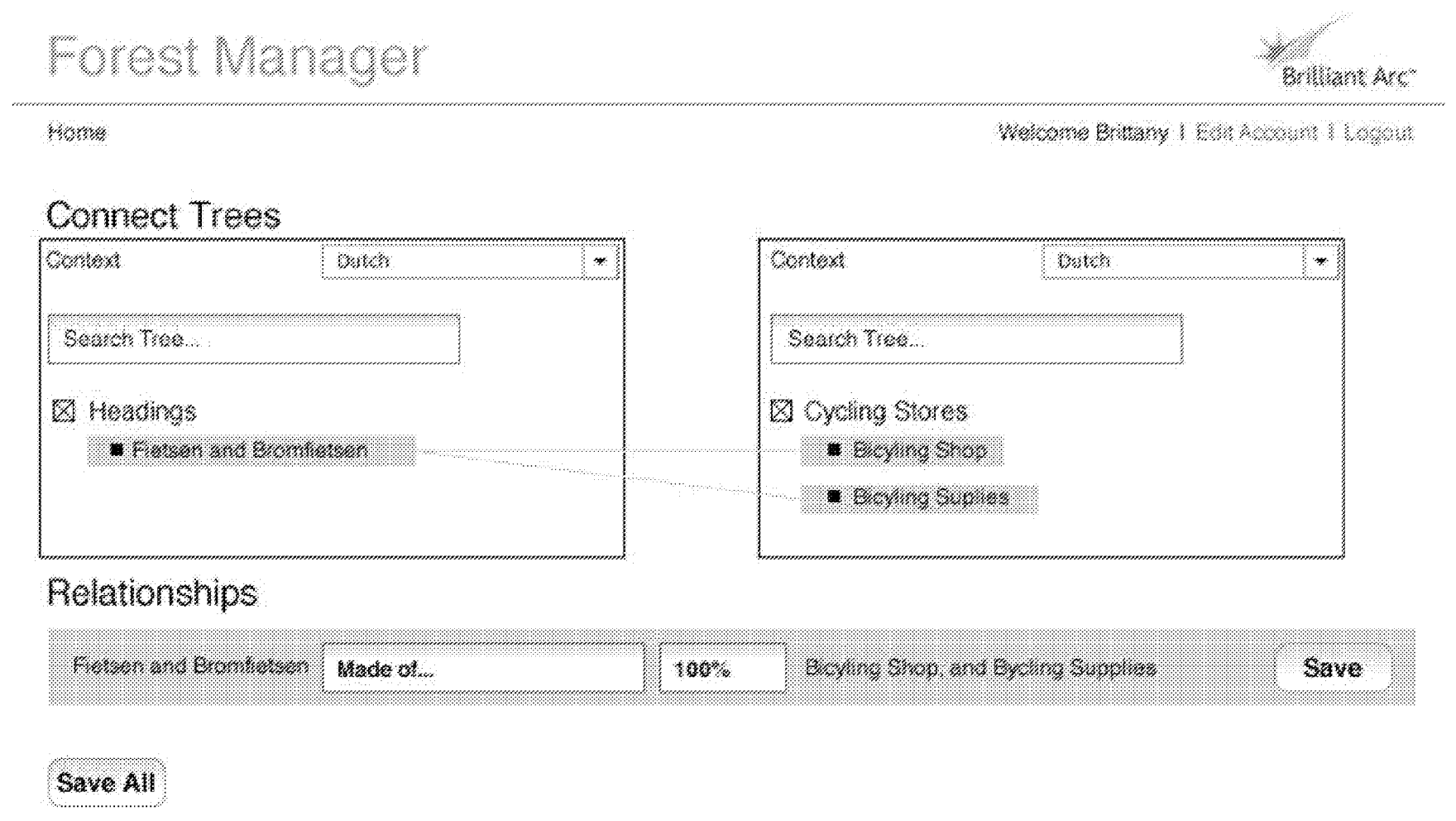
Figure 9:
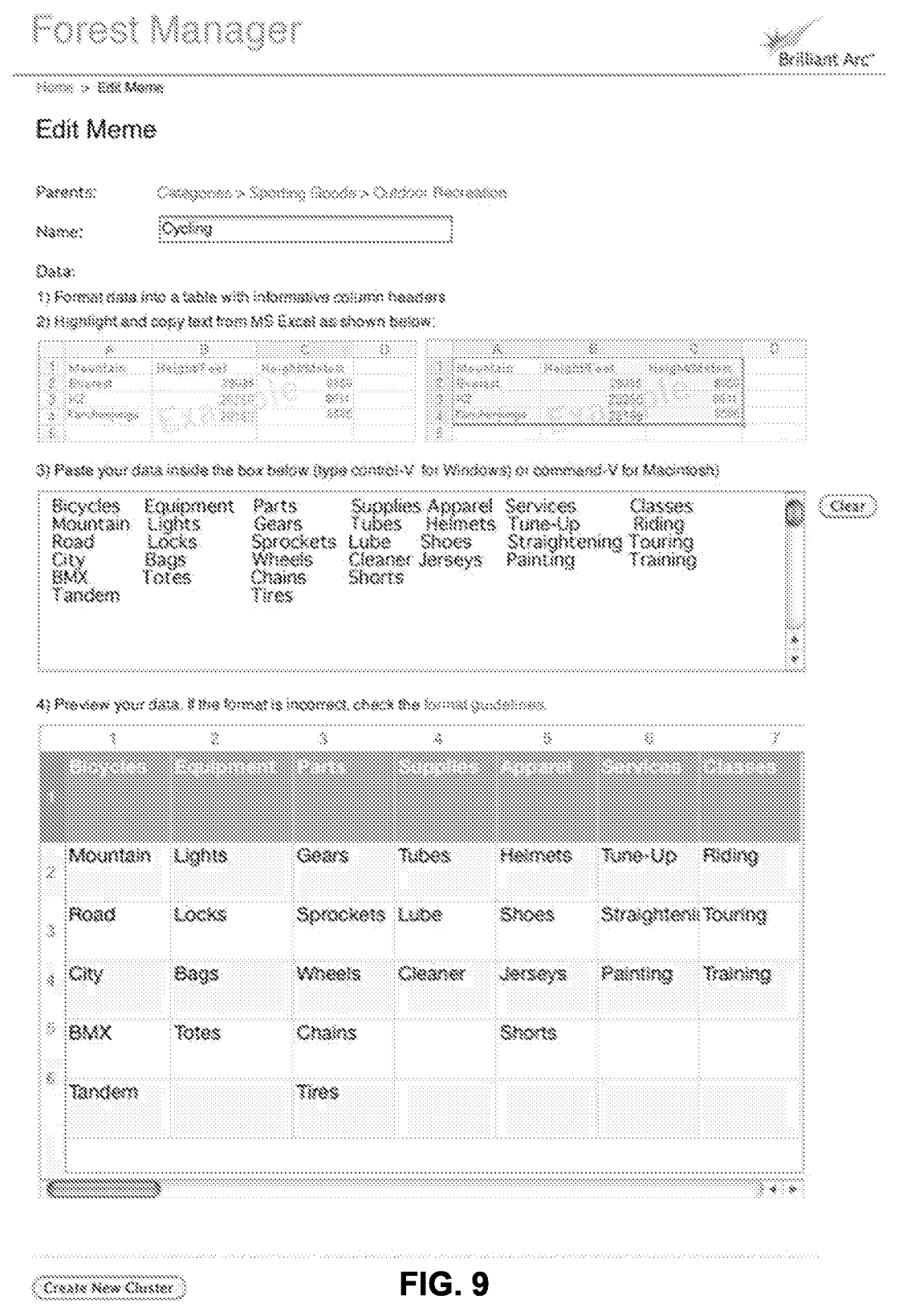

FIG. 7 through FIG. 9 illustrate one embodiment of the use of the system in the management of business category hierarchies across multiple languages through an administrative keyword management system. FIG. 7 shows how multiple hierarchies can created directly or uploaded into the system such as for defining a business category hierarchy within existing or new contexts. FIG. 8 shows how multiple hierarchies can be connected to one another either within or across contexts via typed and weighted relationships. This mapping supports cross-referencing for multiple standard and emerging hierarchies, such as between NAICS (North American Industrial Classification System), UNSPSC (United Nations Standard Products and Services Code), and Google Products. FIG. 9 shows how a single keyword can be connected to a large number of other keywords using typed and weighted relationships within a context. Together, these illustrate, in one embodiment of the system, how keywords are managed in a knowledge base through different types of weighted relationships to one another and how they can related across different contexts as translations into different languages. Groups of keywords can even be "inherited" by other keywords, for example, the group of keywords around "Cycling" could be inherited from subcategories of Cycling, such as Bike Shops, Bike Repair, and Bike Supplies. New keywords can also be generated from such a knowledge-based management system. For example, "Bike Stores", "Bicycle Shops" and "Bicycle Shops" can all be generated from "Bike Shops" as "Search Synonyms."

A Content Collection System

In one embodiment of the system a content collection system can be driven by the knowledge base derived from the present invention. Hierarchical and tabbed sets of questions can be generated for use in collecting content either directly from a web site, through a phone interview, via automatic web site crawling, or through a combination of means. Content collection for a range of businesses is supported, from very large stores (Sporting Goods) to very small (Bike Shops) to the eclectic (Sporting Goods stores with a Coffee Bar).

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

Example Applications

Example applications could include a to do list manager that helps local residents run errands by automatically revealing favorite and substitute business near destinations and along routes of travel; a shopping alert system for the traveler to reveal eclectic shops and stores with products of potential interest; and a relocation management system that could automatically project the same or similar businesses to those frequently patronized around a previous address; "lifestyle" activities such as "golfing" to find areas with golf courses.

Figure 10:
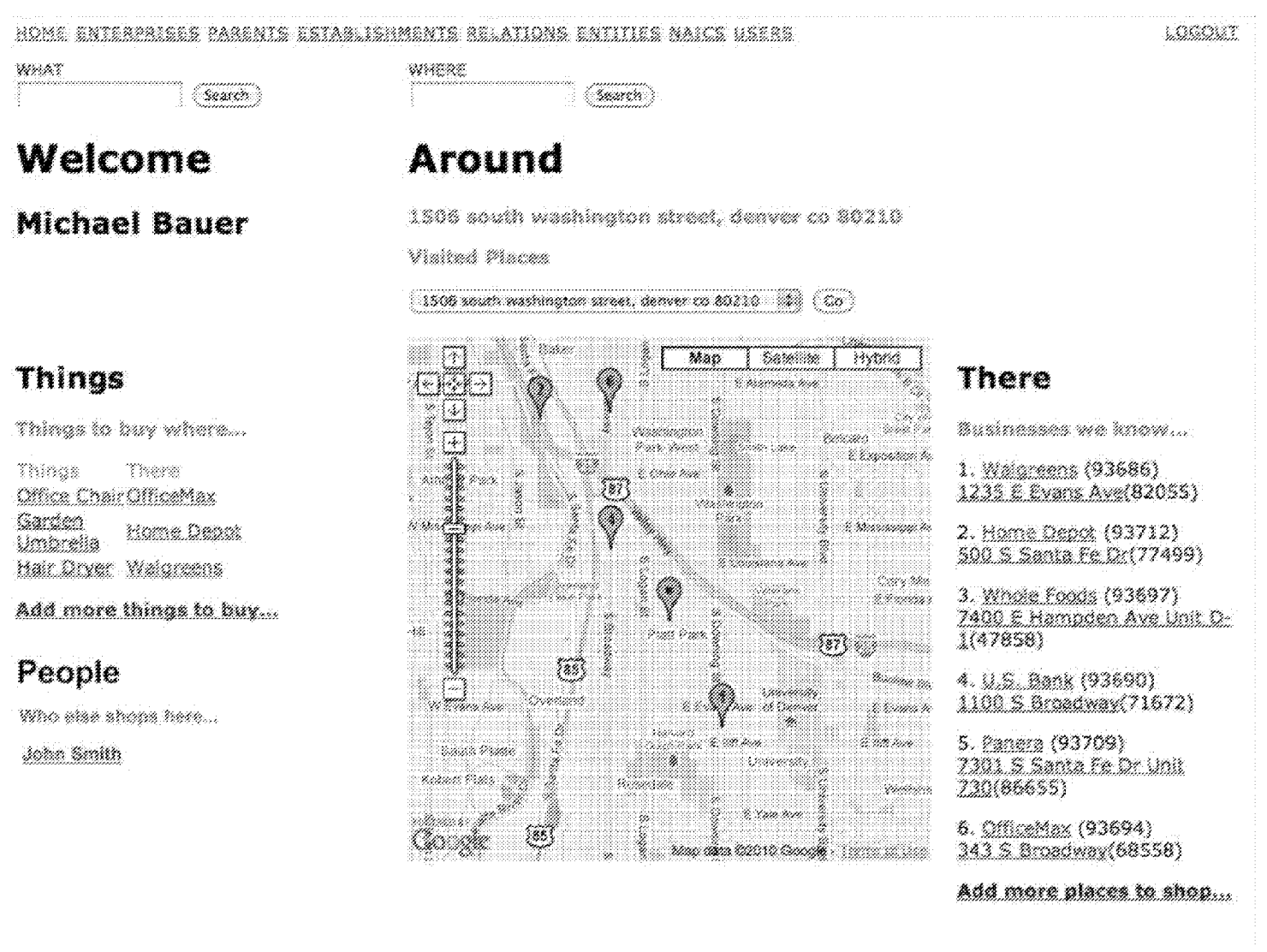

FIG. 10 through FIG. 12 illustrate one embodiment of the system that shows how structured relationships between businesses, consumers, and products can be used in social shopping system. FIG. 10 illustrates one embodiment of a consumer application for a user showing the closest locations of a set of businesses, a set of products and as set of people the user has defined relationships with. FIG. 11 illustrates one embodiment of a consumer application for a user showing all of the locations of a specific business, similar businesses to that specific business, a set of products for that business that a user has established relationships with along with a set of people that also have a relationship to that specific business. FIG. 12 illustrates one embodiment of a consumer application for a user showing a specific product that a user has established a relationship with, the nearest location of a business for that product, and a set of people that have also defined a relationship with that product.

Figure 13:
FIG. 13 shows a road map of a portion of Denver as it might be displayed by a conventional mapping application such as map quest.
Figure 14:
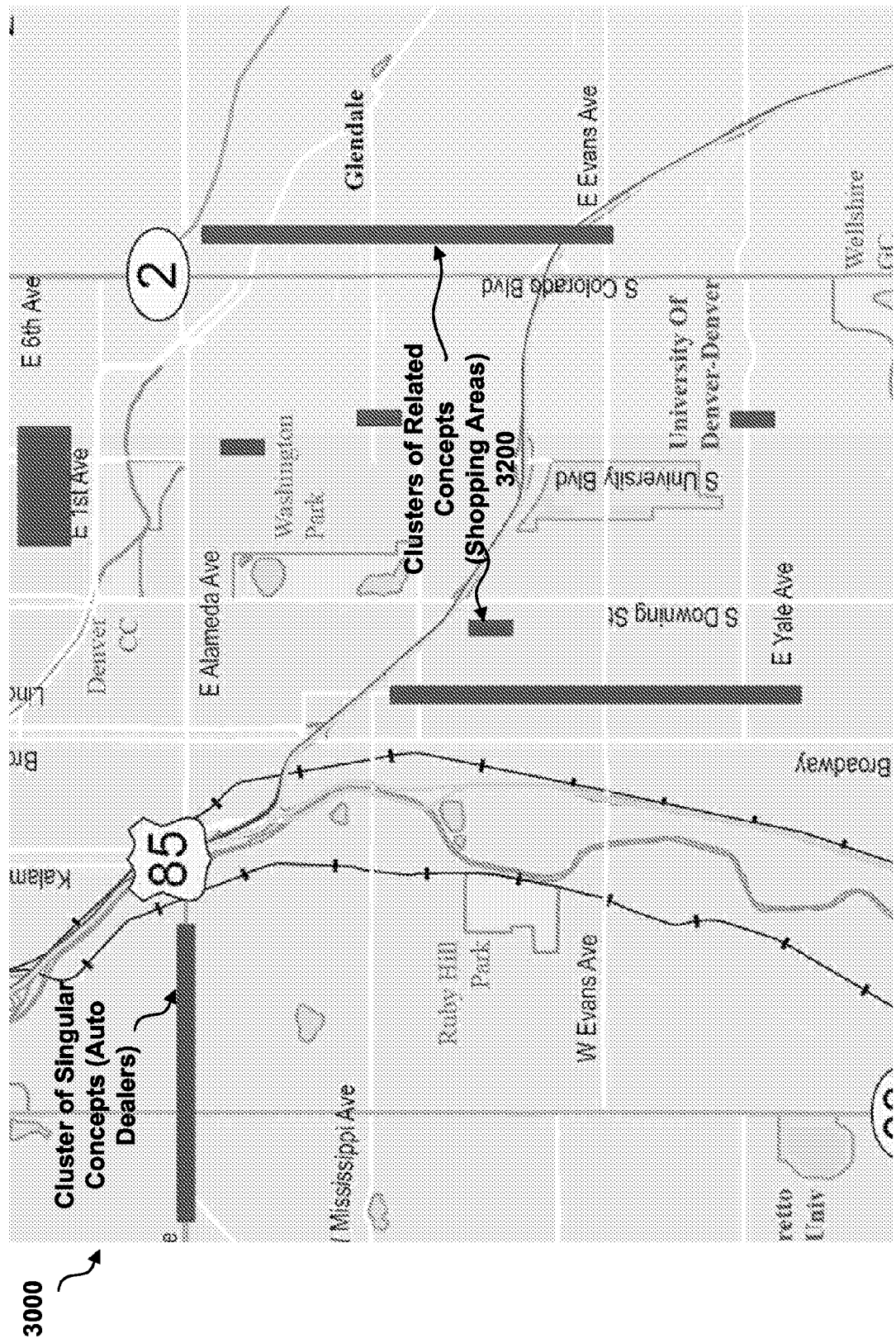
FIG. 14 shows the map of FIG. 7 after it has been customized to display highlighted commercial districts for a user of relevance.
Figure 15:
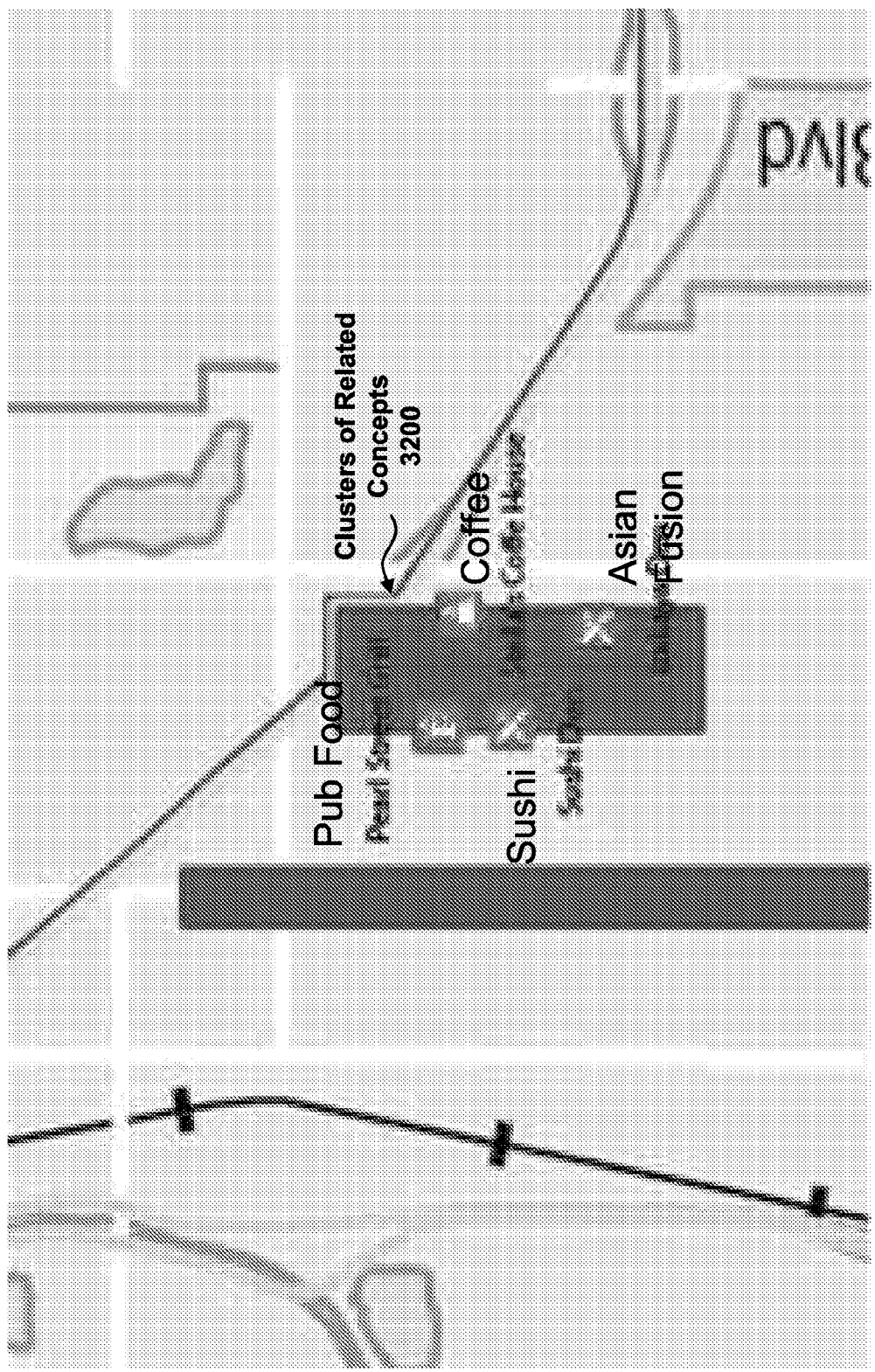
FIG. 15 shows a more detailed view of one cluster of related concepts on the map of FIG. 14.
Figure 16:
FIG. 16 illustrates one embodiment of an iPhone application for mobile local product and business discovery, exploration, and chronicling, showing the use of time (morning) to initiate a dialogue with the user to determine activities to filter local search results.
Figure 17:
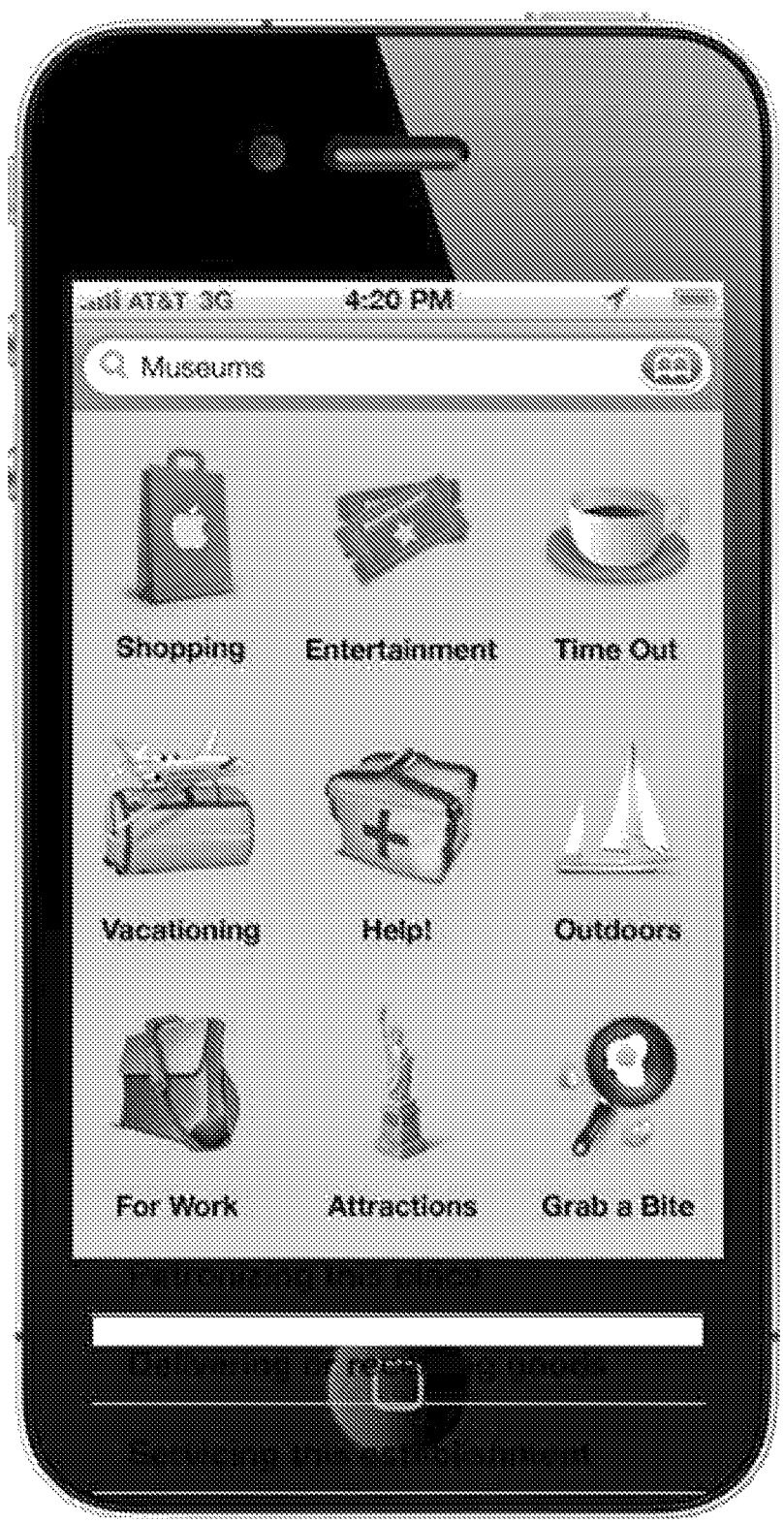
FIG. 17 illustrates one embodiment of an iPhone application for mobile local product and business discovery, exploration, and chronicling, showing the further selection of activities instead of categories to filter local search results.
Figure 18:
FIG. 18 illustrates one embodiment of an iPhone application for mobile local product and business discovery, exploration, and chronicling, showing the discovery of local products on a map (Coffee) in addition to the business name but instead of "categories."
Figure 19:
FIG. 19 illustrates one embodiment of an iPhone application for mobile local product and business discovery, exploration, and chronicling, showing the detail for a business location along with the additional products and services available at this location as well as a link to a page for all locations of the business.
Figure 20:
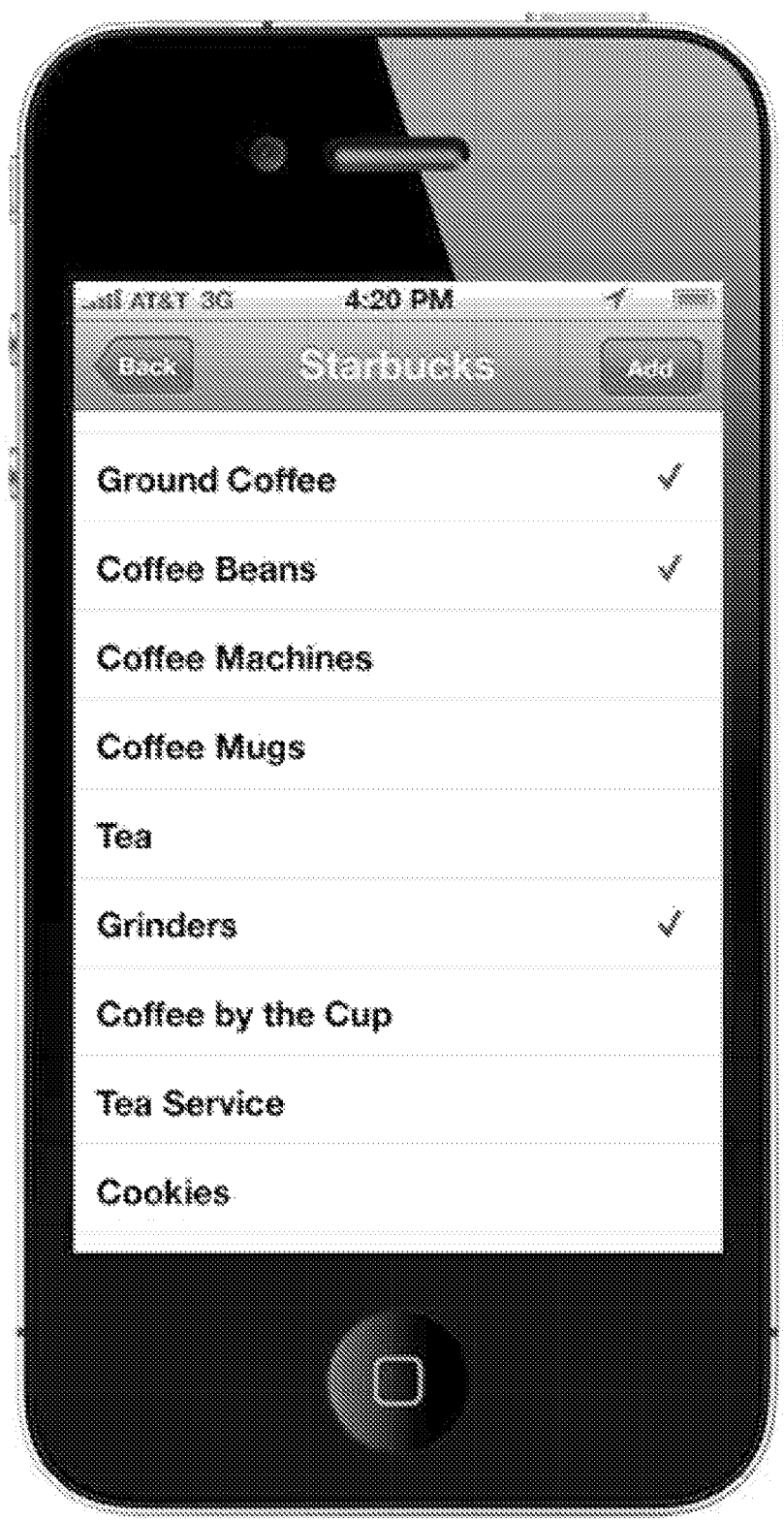
FIG. 20 illustrates one embodiment of an iPhone application for mobile local product and business discovery, exploration, and chronicling, showing how additional structured content about a location can be provided by the user.
Figure 21:
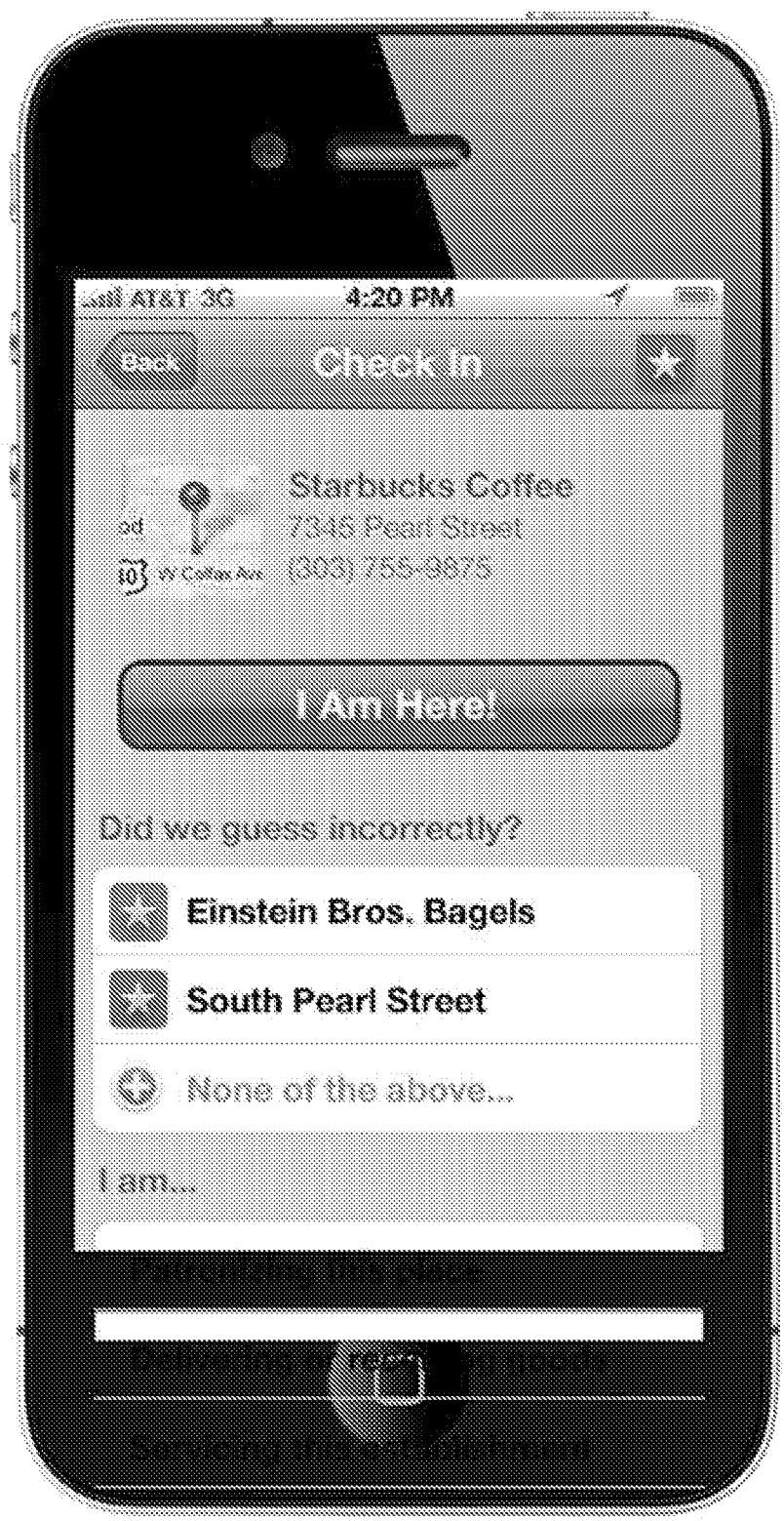
FIG. 21 illustrates one embodiment of an iPhone application for mobile local product and business discovery, exploration, and chronicling, showing a user checking into either a specific location or an area such as a neighborhood or business district instead of a specific business.
Figure 22:
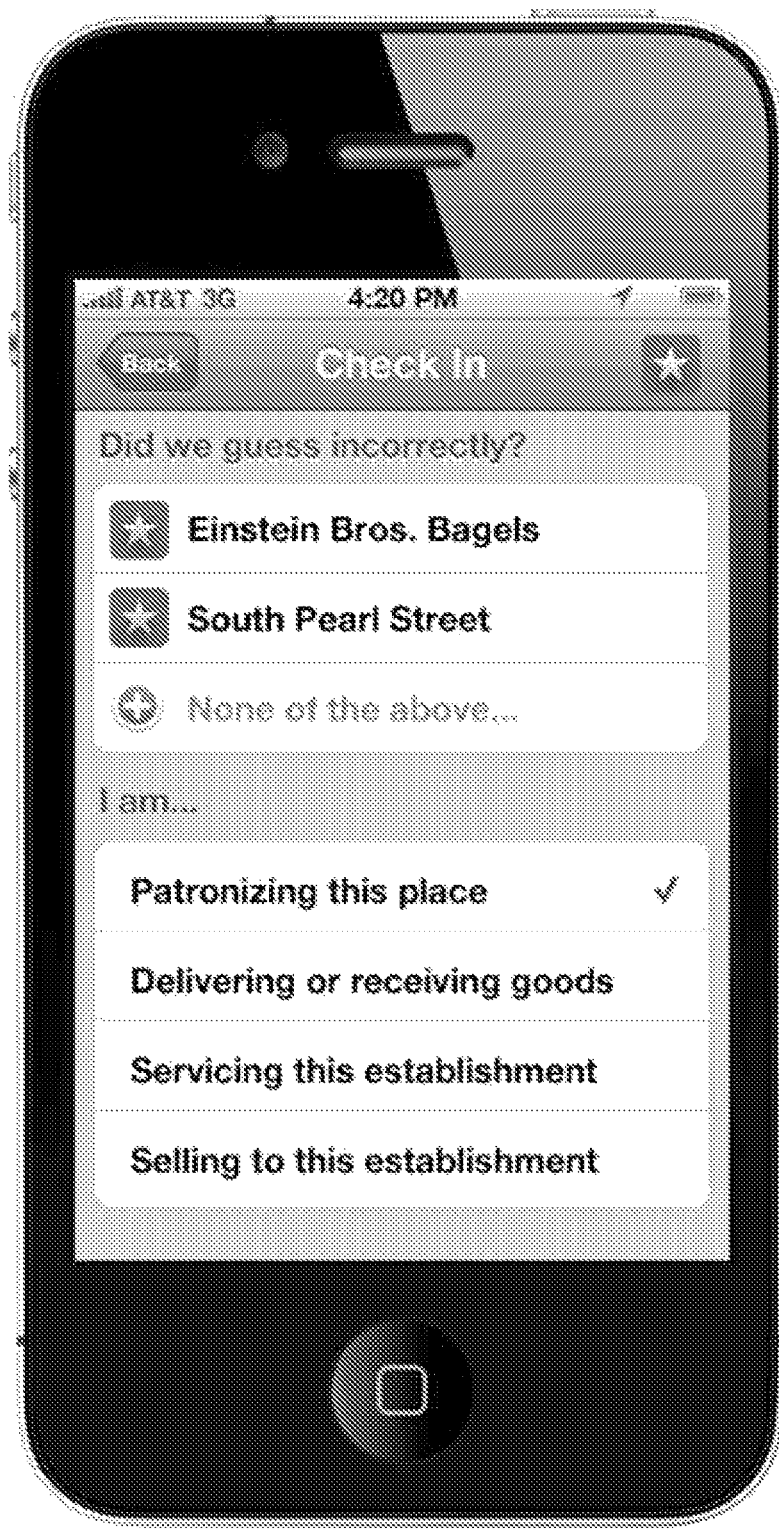
FIG. 22 illustrates one embodiment of an iPhone application for mobile local product and business discovery, exploration, and chronicling, showing how a user can check into a location in a particular role, such as a patron, delivery person or salesperson.

FIG. 13 through FIG. 15 illustrates one embodiment of the system graphically displaying relationships on a map that have been derived for the user. FIG. 13 shows a road map of a portion of Denver as it might be displayed by a conventional mapping application such as map quest. FIG. 14 shows the map of FIG. 7 after it has been customized to display highlighted commercial districts for a user of relevance. FIG. 15 shows a more detailed view of one cluster of related concepts on the map of FIG. 14.

FIG. 16 through FIG. 22 illustrates one embodiment of the system showing a local mobile discovery, exploration and chronicling tool. The application supports a user in discovering local products and services based on time of day and activity. Users engaged in finding something to eat or drink are typically going to be interested in different things at different times of day (coffee in the morning, cocktails in the evening). The application presents the location of specific products (in addition to a business name and instead of general categories). This allows the user to find related products (and services) all together on one map (coffee and baked goods in the morning, cocktails and tapas in the evening). This helps the user avoid guessing what a location provides (providing a business name for "Izakaya Den" does not help a user know what that business provides: cocktails and tapas). This also helps the user avoid guessing what "categories" to search to find a product and find products across categories. For example, a search for "pastries" does not make the user search for "bakeries" and would also return results that would include "Starbucks" a "coffee shop." The user can change the time of day (or day of week) to discover what an area offers at other times. The user can check into a specific location or a general area, such as a neighborhood or business district. When checking into a specific location, a user can see much more of what that location provides through structured content. By using the knowledge base, the user can see the primary products for a business (coffee or cocktails) as well as ancillary "products" such as a patio. The user can then look for other locations of products and services or see all of the locations for a particular establishment through a "corporate" page (all the Starbucks). Through the knowledge base, the system can differentiate among search results so that it will return a set of results for "patio" that will be restricted to those that are a "facility" for eating and drinking establishments and exclude non-relevant results (providers of patio furniture or contractors who build patios). In addition, while checking into a location a user can specify a particular "role" when doing so, such as a patron, delivery person, or salesperson and so providing further information for filtering relevant information (and supporting business-to-business use). By providing such profile information, users can be presented with more relevant results (showing places popular with older adults or places geared for women shoppers). Bookmarking locations (and by implication all other locations for the corporation) helps the user provide a local "radar" to see the nearest locations for all of their favorite corporations (as in FIG. 10).

I claim:

1. A method comprising:
collecting, over a network, data relating to a plurality of keywords, wherein the data relating to keywords comprises:
a plurality of concept keywords, each concept keyword relating to one of a plurality of concepts and data relating to relationships among the plurality of concepts,
data relating to a plurality of entity keywords, each entity keyword relating to one of a plurality of entities and data relating to relationships among the plurality of entities, and
data relating to relationships between the plurality of entities and the plurality of concept keywords;
storing, using at least one computing device, the data relating to a plurality of keywords, on a knowledgebase stored on a computer-readable medium,
wherein the plurality of concept keywords and the data relating to relationships among the plurality of concepts is used to create a hierarchy of concept definitions having a plurality of typed and weighted concept-to-concept relationships with one another, and
wherein the data relating to a plurality of entities is used to create a plurality of entity profiles, each entity profile relating to one of the plurality of entities, and
wherein the data relating to relationships among the plurality of entities is used to create a plurality of typed and weighted entity-to-entity relationships, and
wherein the data relating to relationships between the plurality of entities and the plurality of concept keywords is used to create a plurality of typed and weighted entity-to-concept relationships.

2. The method of claim 1 wherein the data relating to relationships among the plurality of concepts indicates that at least a first one of the plurality of concepts is derived from at least a second one of the plurality of concepts and at least a third one of the plurality of concepts.

3. The method of claim 1 wherein the data relating to relationships among the plurality of entities indicates that at least a first one of the plurality of entities is derived from at least a second one of the plurality of entities and at least a third one of the plurality of entities.

4. The method of claim 1 wherein the user's current concept comprises the demographic (male/female, age group, postal code) or chosen role of the use (consumer, vendor, or employee).

5. The method of claim 1 wherein the user's current concept comprises a history of queries and preferences for the at least one entity profile corresponding to those queries.

6. The method of claim 1, further comprising the step of determining, using the at least one computing device, the history of the user's current concept, wherein the at least one concept definition has at least one relationship with the user's current concept and the at least one additional concept definition has at least one relationship with the user's current concept.

7. The method of claim 1, further comprising the step of determining the history of other users and the knowledgebase itself to predict current and future queries on behalf of the user and transmit to the user at least a portion of the data relating to the at least one entity profile automatically or upon request for a prediction.

8. The method of claim 1, further comprising the step of determining the history of other users and the knowledgebase itself to filter and modify the ranking of the at least one entity profile either upon response to a user query or automatically or upon request for a prediction.

9. The method of claim 1, further comprising the step of determining the history of the user's concept with the history of other users and the knowledgebase itself to provide alternatives to preferences for the at least one entity either upon response to a user query or automatically or upon request for a prediction.

10. The method of claim 1, further comprising the step of determining the history of the user's concept along with the history of other users and the knowledgebase itself to reduce or expand the geographic radius of the set of the at least one entity profile either upon response to a user query or automatically or upon request for a prediction.

11. The method of claim 1, further comprising the step of determining the history of the user's concept from the history of other users and the knowledgebase itself to determine and to collect additional data relating to the at least one entity profile.

12. The method of claim 11 wherein the determining step derives at least one new entity profile representing an aggregate of entity profiles and transmit to the user at least a portion of the data relating to the at least one new entity profile upon response to a user query or automatically or upon request for a prediction.

13. The method of claim 5, further comprising the step of determining the history of other users and the knowledgebase itself to predict current and future queries on behalf of the user and transmit to the user at least a portion of the data relating to the at least one entity profile automatically or upon request for a prediction.

14. The method of claim 5, further comprising the step of determining the history of other users and the knowledgebase itself to filter and modify the ranking of the at least one entity profile either upon response to a user query or automatically or upon request for a prediction.

15. The method of claim 5, further comprising the step of determining the history of the user's concept with the history of other users and the knowledgebase itself to provide alternatives to preferences for the at least one entity either upon response to a user query or automatically or upon request for a prediction.

16. The method of claim 5, further comprising the step of determining the history of the user's concept along with the history of other users and the knowledgebase itself to reduce or expand the geographic radius of the set of the at least one entity profile either upon response to a user query or automatically or upon request for a prediction.

17. The method of claim 5, further comprising the step of determining the history of the user's concept from the history of other users and the knowledgebase itself to determine and to collect additional data relating to the at least one entity profile.

18. The method of claim 16, wherein the determining step derives at least one new entity profile representing an aggregate of entity profiles and transmit to the user at least a portion of the data relating to the at least one new entity profile upon response to a user query or automatically or upon request for a prediction.

19. The method of claim 4, further comprising the step of determining the history of the user's concept from the history of other users and the knowledgebase itself to determine and to collect additional data relating to the at least one entity profile.

20. The method of claim 18, wherein the determining step derives at least one new entity profile representing an aggregate of entity profiles and transmit to the user at least a portion of the data relating to the at least one new entity profile upon response to a user query or automatically or upon request for a prediction.

* * * * *